United States Patent
Mitsuhashi et al.

[11] Patent Number: 5,579,046
[45] Date of Patent: Nov. 26, 1996

[54] VOICE FILTER SYSTEM FOR A VIDEO CAMERA

[75] Inventors: Yasuo Mitsuhashi; Masaki Morita, both of Nagaokakyo, Japan

[73] Assignee: Mitsubishi Denki Kabushiki Kaisha, Tokyo, Japan

[21] Appl. No.: 300,520

[22] Filed: Sep. 6, 1994

Related U.S. Application Data

[63] Continuation of Ser. No. 99,407, Jul. 30, 1993, abandoned, which is a continuation of Ser. No. 727,003, Jul. 8, 1991, abandoned.

[30] Foreign Application Priority Data

Jul. 26, 1990 [JP] Japan ................................ 2-199800
Oct. 24, 1990 [JP] Japan ................................ 2-288240

[51] Int. Cl.⁶ .................................................. H04N 5/225
[52] U.S. Cl. ............................ 348/232; 348/373; 381/92
[58] Field of Search ................................ 348/373, 375, 348/376, 207, 232; 381/92; 358/906

[56] References Cited

U.S. PATENT DOCUMENTS

| | | | |
|---|---|---|---|
| 4,354,059 | 10/1982 | Ishigaki et al. | 381/92 |
| 4,472,742 | 9/1984 | Hasegawa et al. | 358/227 |
| 4,550,343 | 10/1985 | Nakatani | 358/906 |
| 4,764,817 | 8/1988 | Blazek et al. | 358/909 |
| 4,862,278 | 8/1989 | Dann et al. | 358/906 |
| 5,062,010 | 10/1991 | Saito | 358/909 |
| 5,193,117 | 3/1993 | Ono et al. | 381/92 |

FOREIGN PATENT DOCUMENTS

| | | | |
|---|---|---|---|
| 3102208 | 12/1981 | Germany | 381/92 |
| 59-064994 | 4/1984 | Japan | 381/92 |
| 62-189898 | 8/1987 | Japan | 381/92 |
| 63-082197 | 4/1988 | Japan | 381/92 |
| 2-70195 | 3/1990 | Japan . | |
| 2206975 | 8/1990 | Japan | H04N 5/225 |

OTHER PUBLICATIONS

"Funkschau" 17/1985.

*Primary Examiner*—Wendy Garber

[57] ABSTRACT

A one-piece type video camera comprises a device for taking the image of a subject, a device for collecting the voice and a device for magnetically recording the image and voice, all of which are built in the camera as one piece. The voice collecting device includes a microphone for collecting the voice incoming from the subject and another microphone for collecting the operator's voice. The operator's voice is subtracted from the voice incoming from the subject such that only the latter will be recorded. The operator's voice is utilized in the voice recognition technique so as to control the entire system of the video camera. In a preferred embodiment, the microphones are directional microphones.

5 Claims, 11 Drawing Sheets

VOICE FILTER SYSTEM FOR A VIDEO CAMERA

This application is a continuation of application Ser. No. 08/099,407 filed on Jul. 30, 1993, which is a continuation application of Ser. No. 07/727,003 filed on Jul. 8, 1991 now all abandoned.

BACKGROUND OF THE INVENTION

1. Field of the Invention:

The present invention relates to a one-piece type video camera.

Figure 10:
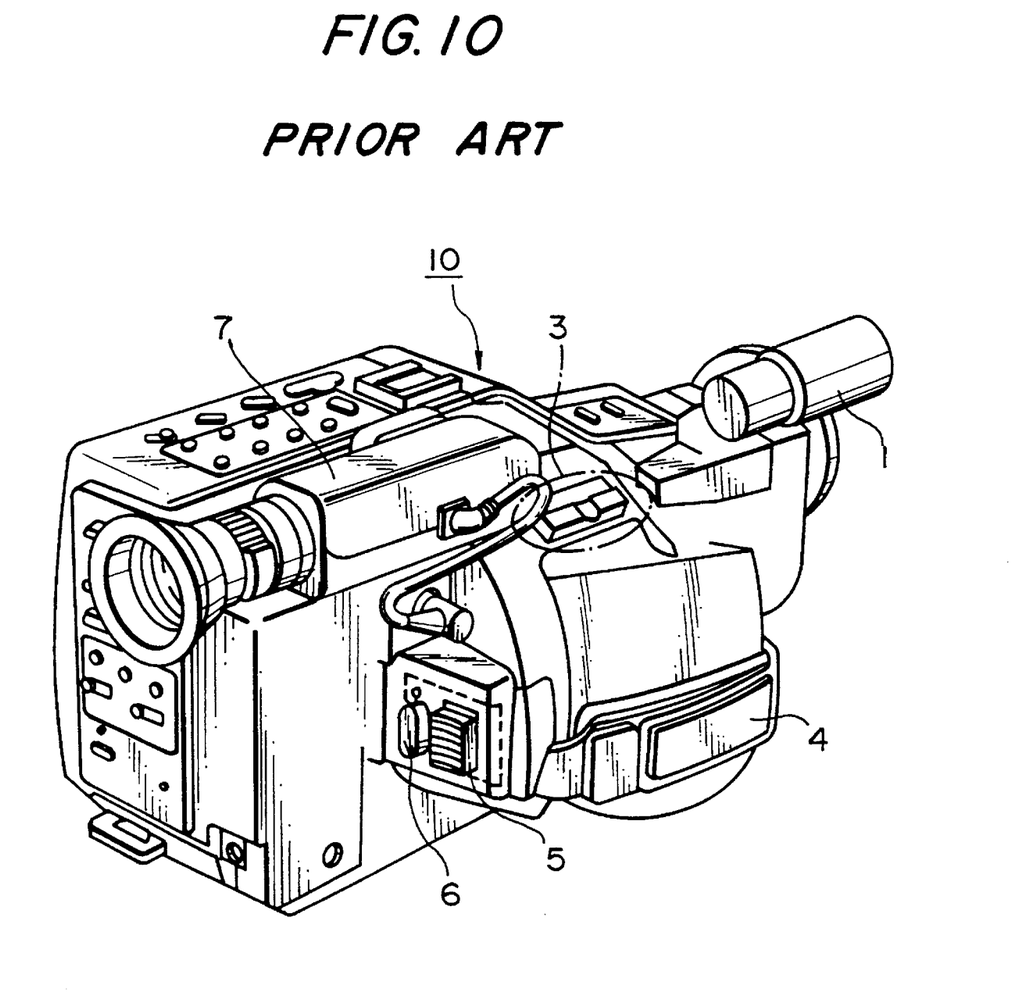
FIG. 10 is a perspective view illustrating the external form of a one-piece type video camera according to the prior art.
Figure 11:
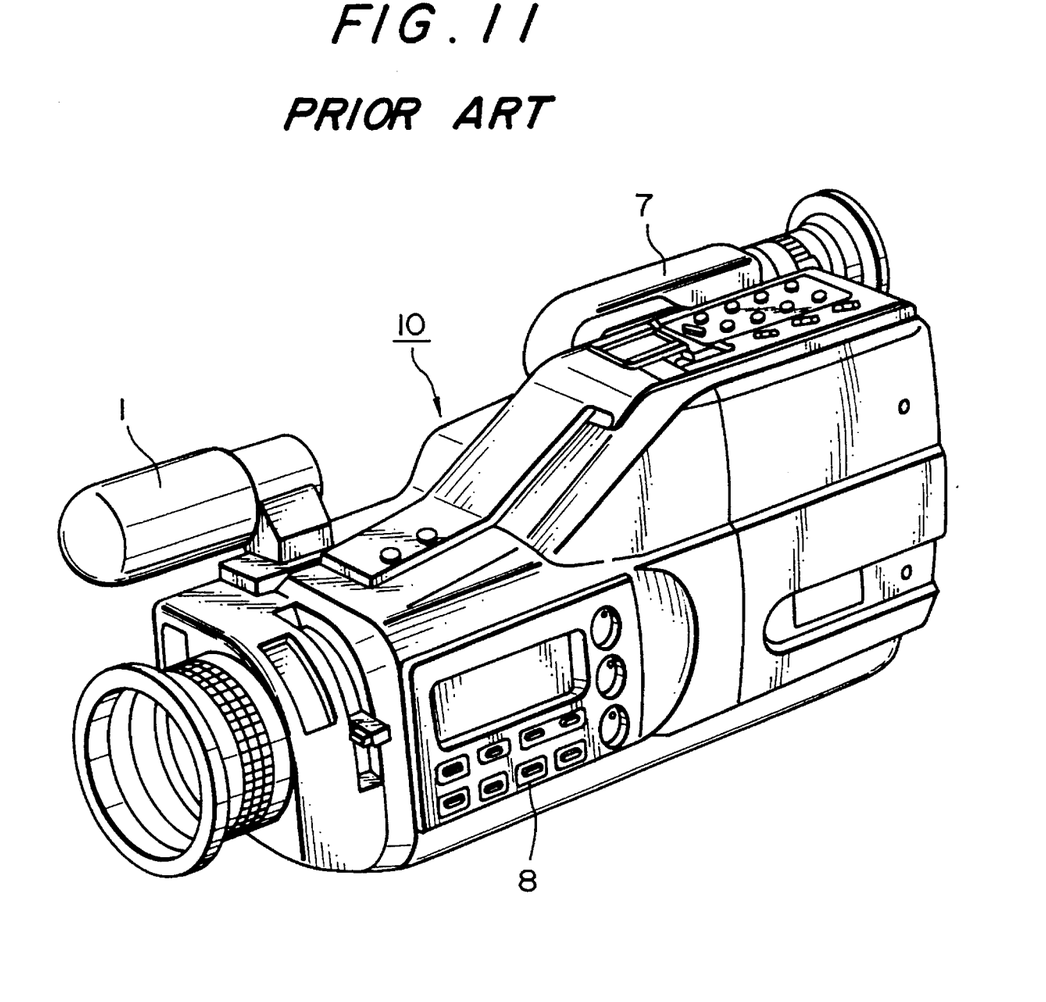
FIG. 11 is a perspective view illustrating the external form of another one-piece type video camera according to the prior art.

2. Description of the Related Arts:

FIG. 10 is a perspective view of a conventional one-piece type video camera as viewed obliquely from a backward and upward position while FIG. 11 is a perspective view of the same video camera as viewed obliquely from a forward and upward position. The video camera 10 comprises a first microphone 1 for collecting sounds from a subject; a zoom button 3; a grip belt 4; a stand-by switch 5; a start/stop button 6; a view finder for monitoring a scene being shot; and a rear-light compensating switch 8.

When a change in the angle of view is desired in the conventional video camera 10, an operator is required to move one finger in his hand placed within the grip belt 4 and holding the video camera 10 and to depress the zoom button 3. The motion of the operator's finger may provide an undesirable motion in the video camera 10 itself.

If it is also wanted to take a subject placed before a source of light, the operator must manipulate the rear-light compensating switch 8 with his hand other than the hand holding the camera 10. Since this rear-light compensating switch 8 is disposed on the opposite side of the video camera 10 to its area held by the operator's hand, however, the operator may look for the rear-light compensating switch 8 with his eyes. This means that the operator's face is placed out of the view finder 7 so that the scene being shot will not be monitored by the operator.

The operator's voice is collected by the microphone 1 and recorded on a recording tape. Particularly, if the sensitivity of the microphone 1 is increased since the distance between the video camera and the subject is large, the operator's voice will be recorded at an increased recording level without properly recording the voice from the subject.

Furthermore, noises from the internal drive movers of the video camera 10 such as capstan motor, rotary drum motor, zoom drive motor and others also are recorded. It is thus difficult to improve S/N ratio in voice signals.

In order to prevent the video camera from being undesirably moved when performing zooming or rear-light compensation, it may be desirable to control the video camera with generation of the operator's voice. However, this may raise another problem in that the operator's voice commanding the operational mode to the video camera may be at an undesired level on play-back.

SUMMARY OF THE INVENTION

In order to overcome such problems, an object of the present invention is to provide an improved video camera which will not record the operator's voice on a magnetic tape at such a level that the operator's voice becomes an obstacle on play-back.

Another object of the present invention is to provide an improved video camera which can prevent the video camera from being undesirably moved by controlling the operational mode of the video camera with the operator's command voice and yet will not record the operator's command voice on a magnetic tape at such a level that the operator's command voice becomes an obstacle on play-back.

To this end, the present invention provides a video camera comprising:

A) a first microphone having a directivity toward an subject and adapted to collect a voice incoming from the subject and to convert the voice into a first output voice signal;

B) a second microphone having a directivity toward an operator and adapted to collect a voice from the operator and to convert the voice into a second output voice signal;

C) subtractor means for subtracting the second output voice signal from the First output voice signal to Form a differential output signal;

D) an optical system for taking the image of the subject; and

E) recording means for recording the differential signal and the image.

Such an arrangement can prevent the operator's voice from being recorded or reduce the operator's voice to such a level that it will not be any obstacle to the ear.

The subtractor means may consist of an operational amplifier. The operational amplifier may take the first voice signal through its non-invert input terminal and the second voice signal through its invert input terminal. Thus, the output of the operational amplifier will be an amplified signal representing a difference between the first and second voice signals. Such an amplified signal can be used as a differential signal. In other words, the generation of differential signal can be realized simply by any suitable parts currently used in the art.

It is also preferred to provide a switch for selecting either of the first or second voice signal to be supplied to the recording means. This also permits for the operator's voice to be recorded. Thus, the video camera is improved in utility.

In order to further improve the reduction of the level at which the operator's voice is to be recorded, it is preferred to provide a frequency filter for causing the frequency characteristics and level of the second voice signal to match those of the first voice signal.

Considering time required to propagate the voice, still further improvement of the reduction of the level at which the operator's voice is to be recorded can be attained by providing a delay for compensating a difference between time required to propagate the voice between the first microphone and the subject and time required to transmit the voice between the second microphone and the operator.

In addition, voice recognition may be adopted in the present invention. More particularly, the second microphone, which has been used to take the voice to be cut out from the first voice signal, may be utilized to control various sections in the video camera. In such a case, voice recognizing means is used such that it judges whether or not the second voice signal is a given word. If the second voice signal is that word, the voice recognizing means outputs a mode command signal corresponding to the word. The mode command signal is applied to a controller which controls the recording means and/or optical system depending on the mode command signal.

It is further preferred that the second microphone also takes various mechanical vibrations in the one-piece type video camera in addition to the operator's voice. Thus, the adverse affection of the mechanical vibrations to the recording operation can be reduced.

The present invention also provides a video camera comprising:

A) a first microphone having a directivity toward an subject and adapted to collect a voice incoming from the subject and to convert the voice into a first output voice signal;

B) a second microphone having a directivity toward an operator and adapted to collect a voice from the operator and to convert the voice into a second output voice signal;

C) a first envelope detecting circuit for detecting the envelope of the first voice signal;

D) a second envelope detecting circuit for detecting the envelope of the second voice signal;

E) subtractor means for subtracting the output of the second envelope detecting circuit from the output of the first envelope detecting circuit to output a gain control signal;

F) a gain control circuit for controlling the level of the first voice signal depending on the gain control signal;

G) an optical system for taking the image of the subject; and

H) recording means for recording, on a magnetic recording medium, the first voice signal and subject's image which have been controlled in level by the gain control circuit.

In such an arrangement, the subtractor means may be realized by a general circuit component which is an operational amplifier. More particularly, if the non-invert input terminal of the subtractor means receives the output of the first envelope detector while the invert input terminal thereof receives the output of the second envelope detector, the output of the operational amplifier will be an amplified signal representing a difference between the outputs of first and second envelope detecting circuits. This signal can be utilized as a gain control signal.

In addition to the subtractor means, the gain control circuit may be consisted of an operational amplifier which is adapted to take in and amplify the first voice signal. Further, the gain control circuit must have a function which regulates the level of the first voice signal. Such a function can be attained by providing a feedback resistor which is variable in resistance depending on the value of the gain control signal.

It is also preferred herein to provide a switch for selecting whether or not the operator's voice is to be recorded. In such a case, however, this switch will have a function which causes the recording means to receive the first voice signal either when it has passed through the gain control circuit or when the first voice signal has not passed through the gain control circuit.

In addition, this arrangement may include an additional operation control function utilizing the voice recognition with respect to the second voice signal. This can be realized by the aforementioned arrangement.

The present invention further provides a one-piece type video camera comprising:

A) an optical system for taking the image of a subject;

B) a first microphone having a directivity toward an subject and adapted to collect a voice incoming from the subject and to convert the voice into a first output voice signal;

C) a second microphone having a directivity toward an operator and adapted to collect a voice from the operator and any mechanical vibration in the one-piece type video camera and to convert the voice and mechanical vibration into a second output voice signal;

D) a differential amplifier for subtracting the second voice signal from the first voice signal to output an amplified difference signal and also for summing the first and second voice signals to output an amplified sum signal;

E) recording means for recording the difference signal and image on a magnetic recording medium;

F) voice recognizing means for recognizing the sum signal to be voice and for outputting a mode command signal corresponding to a given word if said sum signal is said word; and G) control means for controlling said recording means and said optical system depending on the value of said mode command signal.

This arrangement is characterized by recording the difference signal and controlling the various operational sections in responsive to the sum signal. The arrangement is optimized according to the basic concept of the present invention such that any undesirable noises such as the operator's voice and other noises can be eliminated from voice signals to be recorded and also the one-piece type video camera can be manipulated and used more simply and easily by utilizing the voice recognition. Therefore, the functions and advantages of the present invention can be accomplished by this more simplified arrangement.

The voice recognizing system may be realized as follows:

The voice recognizing system comprises a plurality of analog data generator means each of which filtrates and rectifies a sum signal to generate a channel of analog data. The channels of analog data are then multiplexed by a multiplexer. The multiplexed analog data are converted into digital data by an analog/digital converter. Subsequently, a reference is made to a dictionary data storage section by a microcomputer. The dictionary data storage section stores preselected words. Thus, this reference can obtain information of a necessary word which has been stored in the dictionary data storage section. The microcomputer judges whether or not the digital data is agree with any one of the words which have been stored in the dictionary data storage section. If the digital data is agree with one of these words, the microcomputer outputs a mode command signal representing that word.

DETAILED DESCRIPTION OF THE INVENTION

Figure 1:
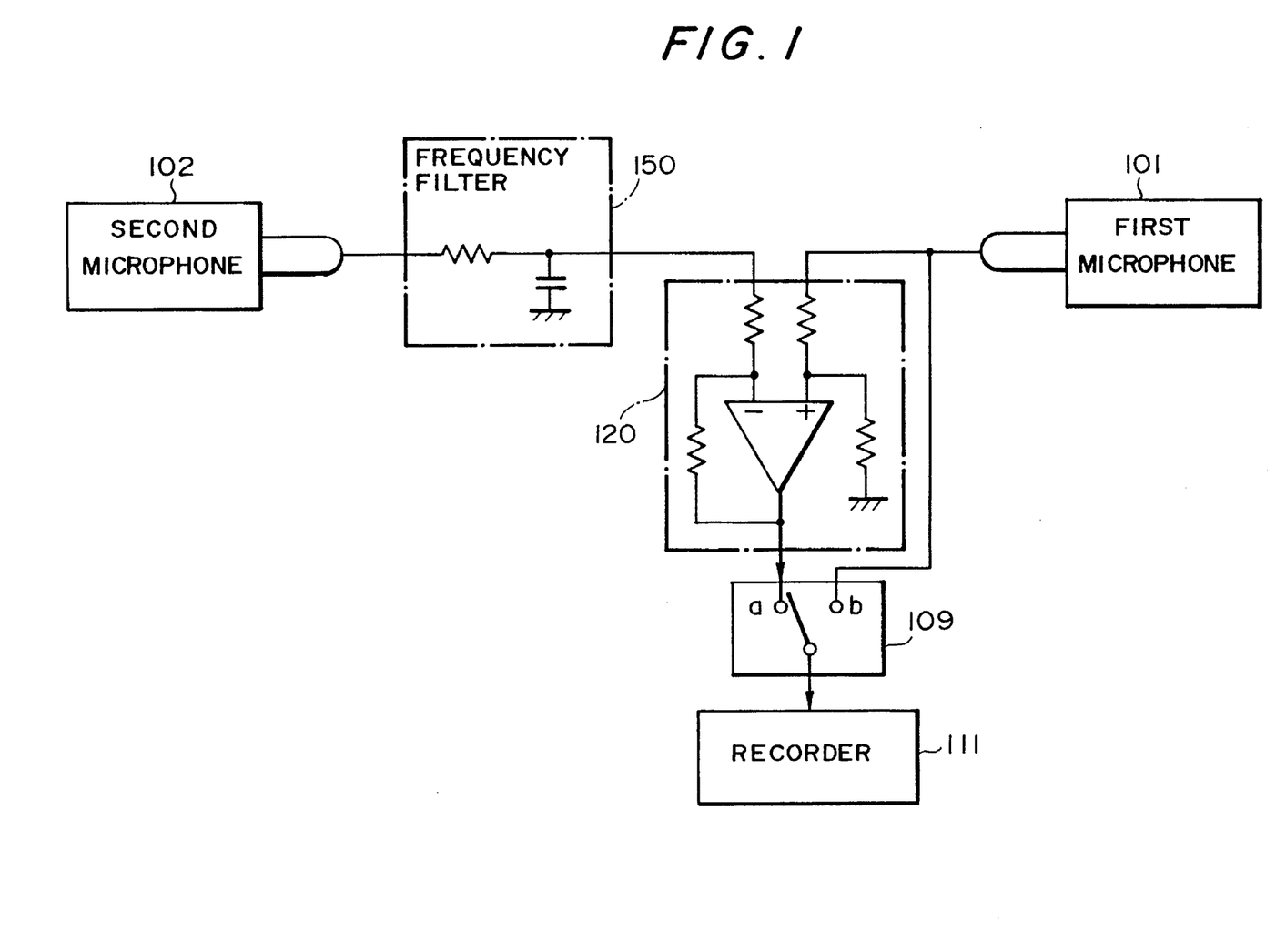
FIG. 1 is a circuit diagram of the first embodiment of a one-piece type video camera constructed in accordance with the present invention.
Figure 2:
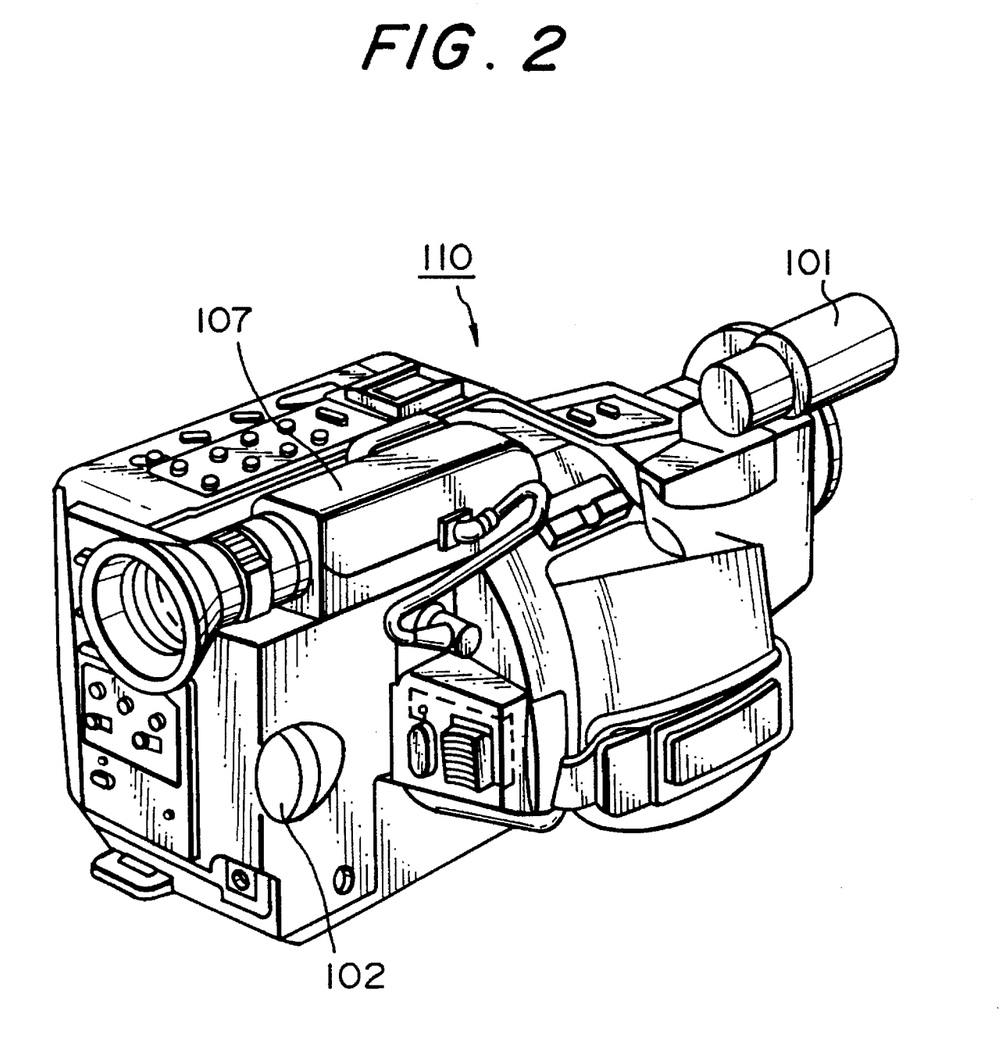
FIG. 2 is a perspective view of the external form of the video camera according to the first embodiment of the present invention.

Referring to FIGS. 1 and 2, there is shown a video camera 110 comprising a second microphone 102 which is a narrow-beamed microphone so located that it will be positioned adjacent to the mouth of an operator when the operator looks in a finder 107. The video camera 110 also comprises a frequency filter 150 having a filter characteristic which is set such that after the operator's voice signal collected through the second microphone 102 has passed through the frequency filter 150, the frequency characteristic and level of that operator's voice signal will be equal to those of the operator's voice signal collected through a first microphone 101. The characteristics of the frequency filter 150 depends on various factors such that the structure of the video camera 110 itself, the directivities of the first and second microphones 101, 102 and others.

The video camera 110 further comprises an operational amplifier 120 which is adapted to subtract the output voice signal of the frequency filter 150 from the voice signal collected through the first microphone 101. Thus, the output voice signal of the operational amplifier 120 will be a new voice signal having a difference component in which the operator's voice is reduced. Thus, the new voice signal will not be recorded at such a level that it becomes an obstacle to the ear on play-back.

The video camera further comprises a switch 109 for selecting one of the output voice signals of the operational amplifier 120 and first microphone 101, which is to be applied to a recording section 111. By operating this switch 109, therefore, the operator's voice can be cut off optionally.

In accordance with the first embodiment, the operator's voice will not be substantially recorded when the switch 109 is shifted to connect with a terminal b. On the other hand, if the switch 109 is on the other terminal a, the operator's voice can be recorded by the recorder 111.

Figure 3:
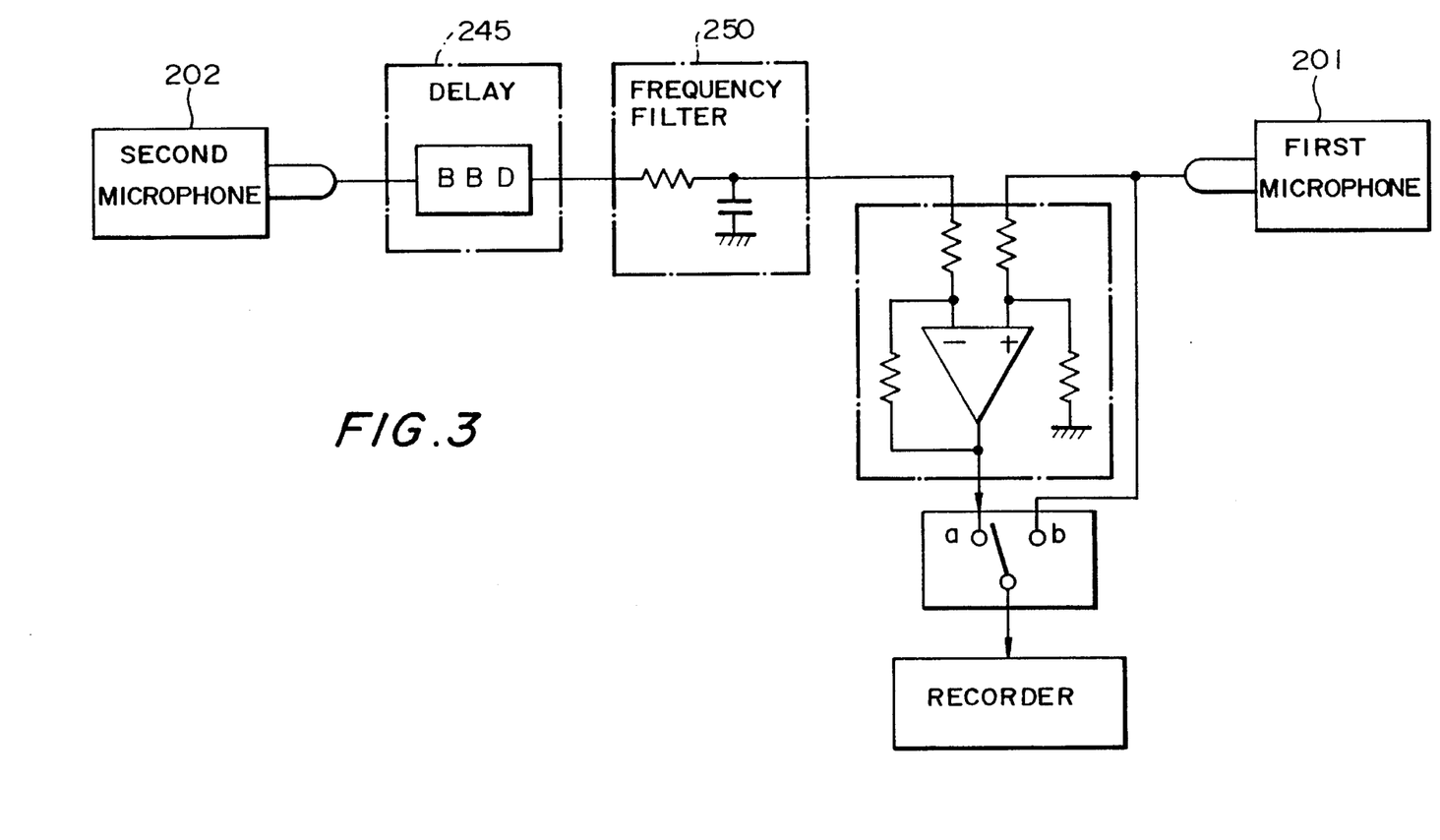
FIG. 3 is a circuit diagram of the second embodiment of a one-piece type video camera constructed in accordance with the present invention.

FIG. 3 shows a block diagram of an internal circuit used in the second embodiment of the present invention, which circuit is similar to that of the first embodiment except that a delay element 245 is added between the second microphone 202 and the frequency filter 250. The delay element 245 is adapted to compensate a time delay between the operator's voice signals respectively collected through the first and second microphones 201, 202. The time delay depends on the positional relationship between the first and second microphones 201, 202. The delay element may be of any suitable configuration such as BBD (bucket brigade device), CCD (charge coupled device), glass delay line or the like.

Figure 4:
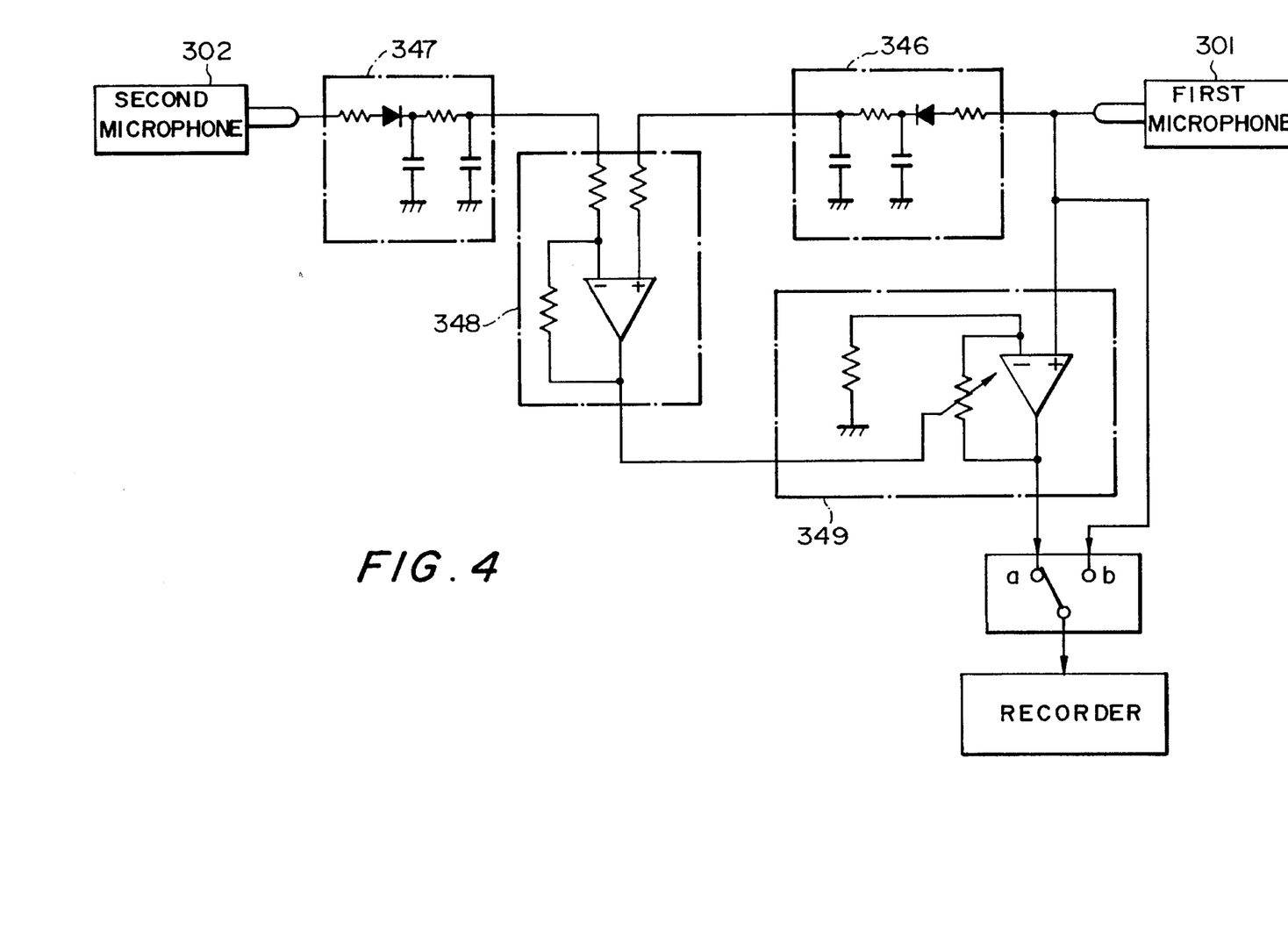
FIG. 4 is a circuit diagram of the third embodiment of a one-piece type video camera constructed in accordance with the present invention.

Referring to FIG. 4, there is shown a circuit which is used in the third embodiment of a video camera constructed according to the present invention. Such a circuit comprises two envelope detectors 346 and 347 which are adapted to detect the envelopes of output voice signals from first and second microphones 301 and 302, respectively. The circuit also comprises an operational amplifier 348 for comparing the output signals from the first and second microphones with each other after the envelopes of these output signals have been detected. If there is a difference between the output level at the first and second microphones 301, 302, the output voltage will be high at the operational amplifier 348.

The video camera further includes a gain control circuit 349 for controlling the gain at the output of the first microphone 301 with the output voltage of the operational amplifier 348. If the operator's voice output signal from the second microphone 302 is high, the output of the operational amplifier 348 also becomes high. This results in reduction of the output gain of the first microphone 301 such that the operator's voice will be recorded in a reduced level.

Figure 5:
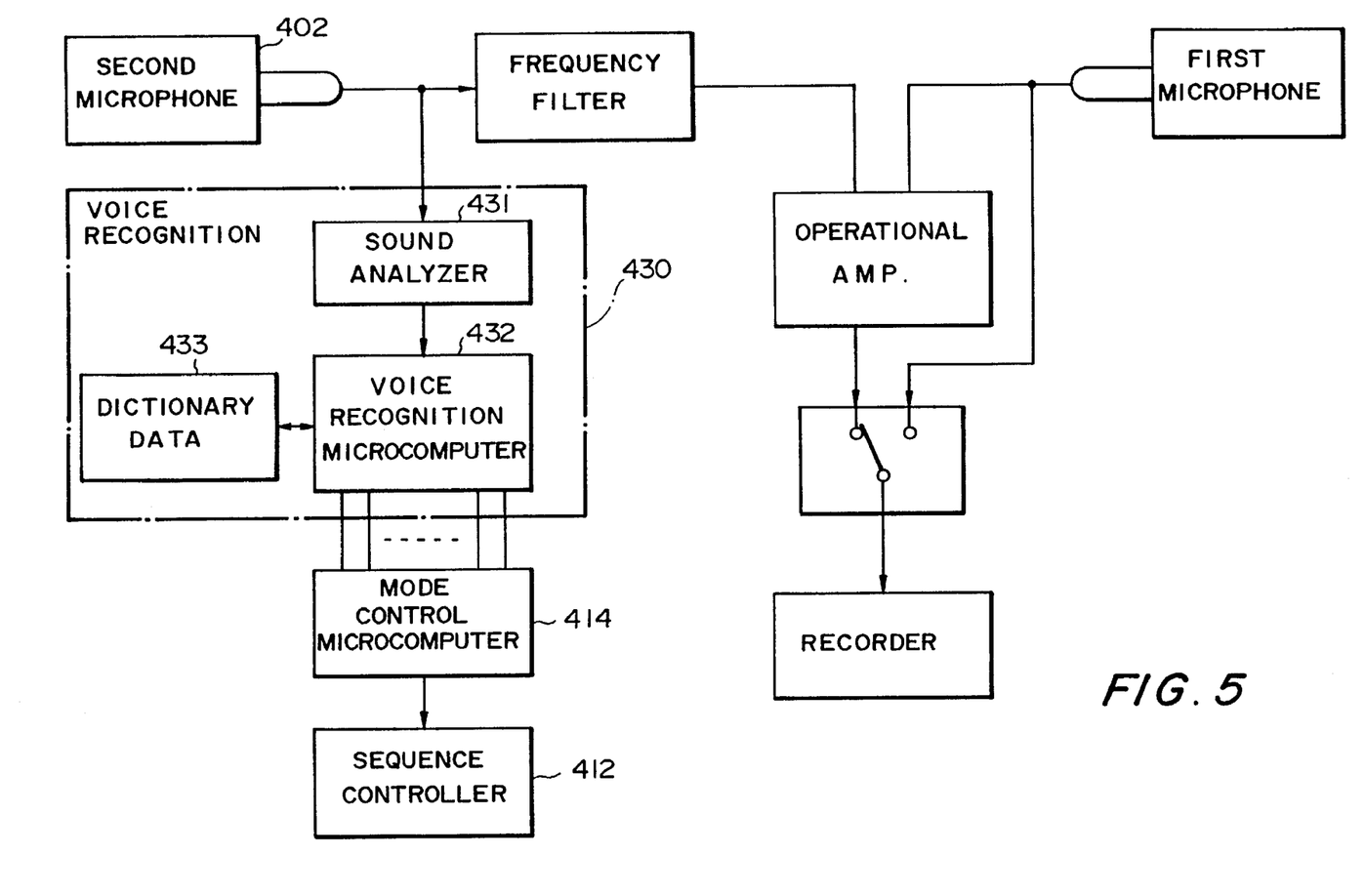
FIG. 5 is a circuit diagram of the fourth embodiment of a one-piece type video camera constructed in accordance with the present invention.

In the fourth embodiment shown in FIG. 5, a video camera utilizes a voice recognizing system 430 which comprises a sound analyzer 431, a voice recognition microcomputer 432 also functioning as a processor, and a dictionary data storage 433, almost all of these parts being in the form of integrated circuit. The voice recognizing system 430 receives the output voice signal of the second microphone 402 and is responsive to any command emitted from the operator to make an output port "high". For example, if the command from the operator is "record", "stop", "zoom" or "rear-light compensation", each of these commands is assigned to make the corresponding one of the output ports 1, 2, 3 and 4 of the voice recognizing system 430 "high". If these output ports are connected with the respective input ports of a mode control microcomputer 414 for controlling various operations of the one-piece type video camera, a sequence controller 412 in the video camera will receive the same sequence signal as generated by actuating any one of various switches for "record", "zooming-up" and others from the voice recognizing system 430 at each time when the respective one of the above commands is emitted from the operator. In such a manner, the operational mode in the video camera can be controlled by the operator's voice.

Although the previous embodiments have been described as to the reduction of the operator's mode commanding voice, the same structure may be used to reduce the mechanical oscillating noises from the drives in the video camera without any adverse affection on recording.

Although the previous embodiments have been described as to only two microphones, more than two microphones may be used to improve the accuracy on recording. Moreover, the second microphone may be in the form of a wired or wireless microphone which is placed remotely from the video camera and adapted to perform the remote control of the video camera with the operator's voice.

Figure 6:
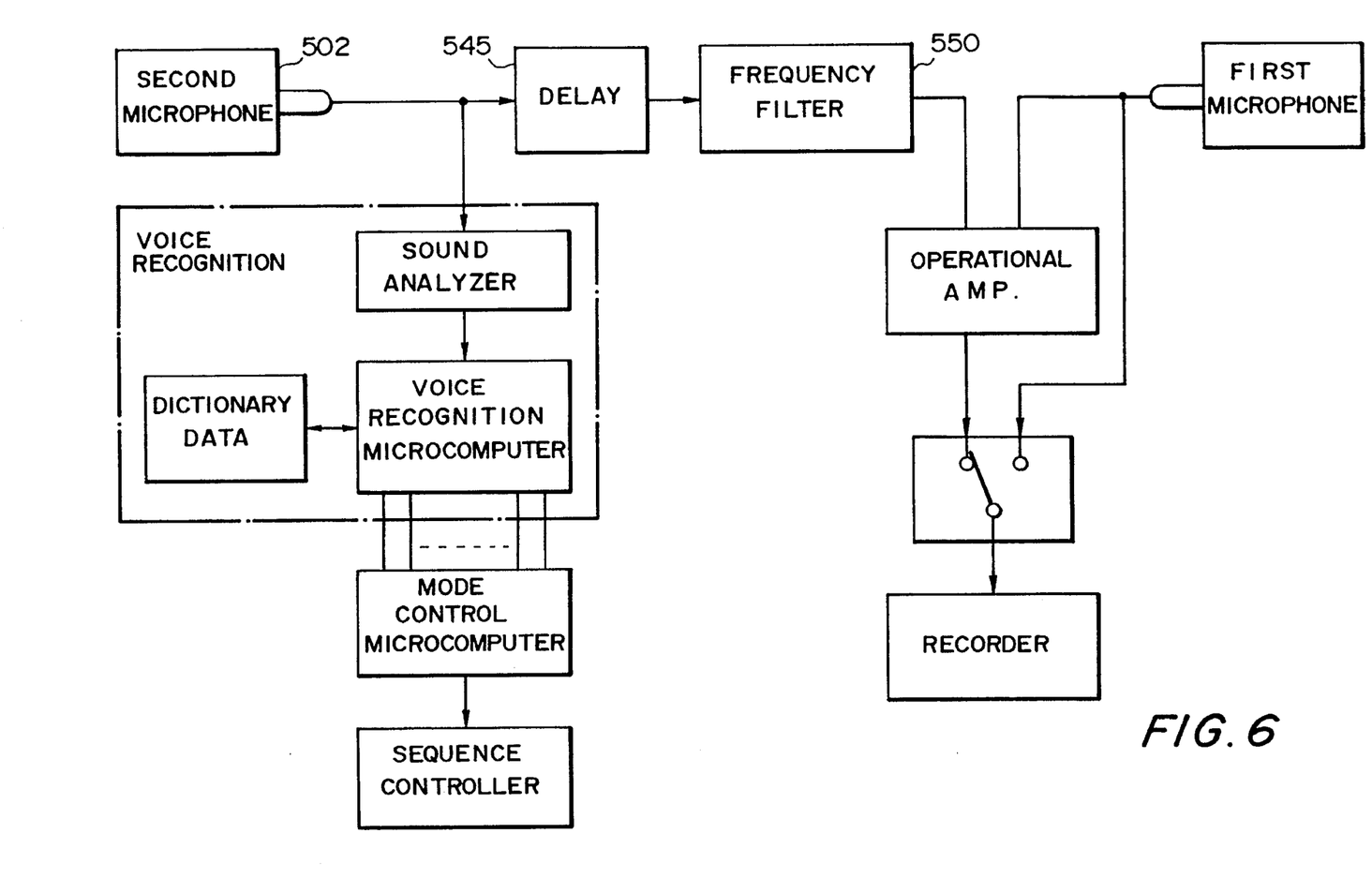
FIG. 6 is a circuit diagram of the fifth embodiment of a one-piece type video camera constructed in accordance with the present invention.

FIG. 6 is a block diagram of a circuit used in the fifth embodiment of the present invention, which circuit is different from the circuit of FIG. 5 only in that a delay element 545 is interposed between a second microphone 502 and a frequency filter 550. This delay element 545 has functions and advantages similar to those of the embodiment shown in FIG. 3.

Figure 7:
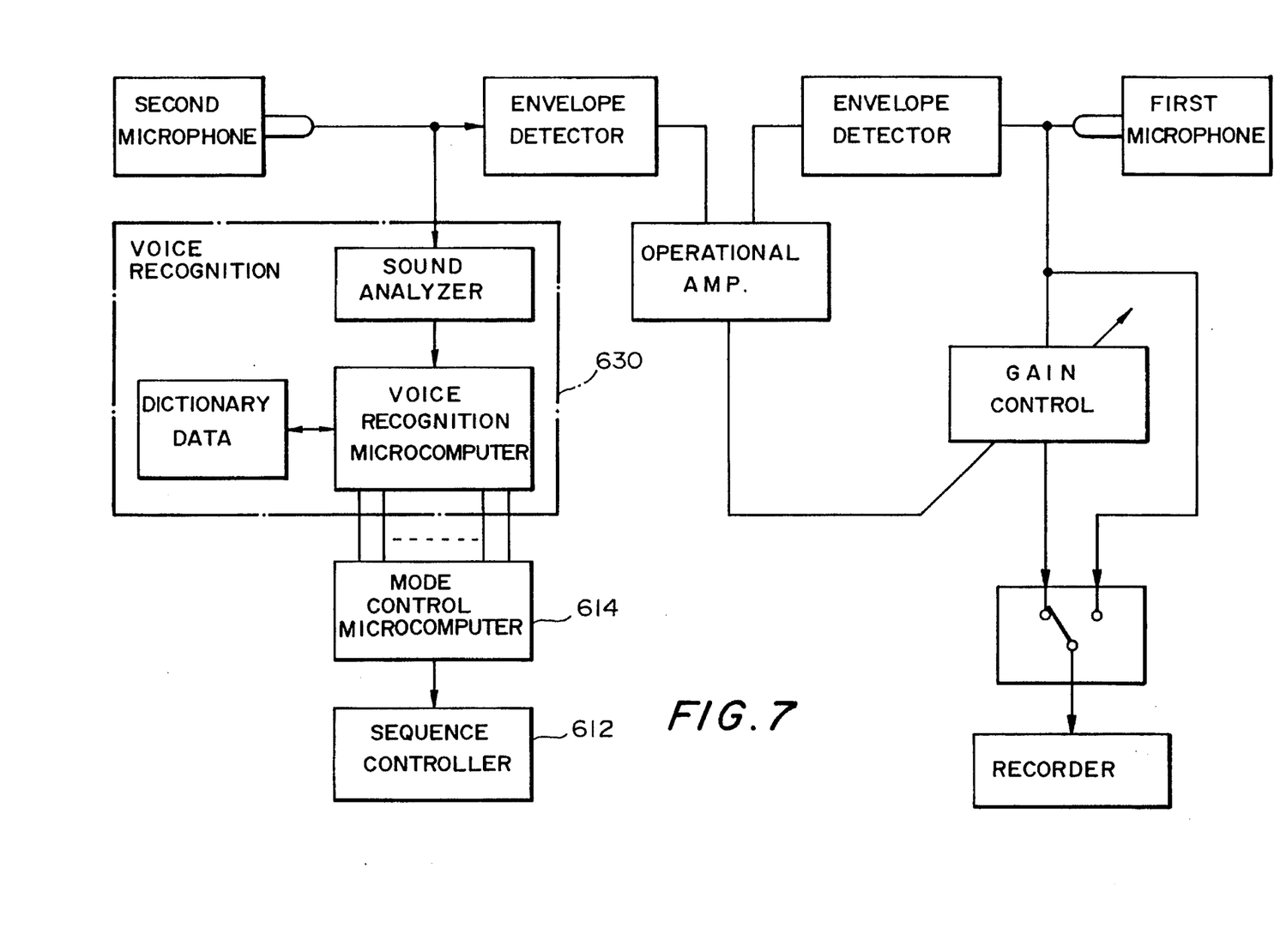
FIG. 7 is a circuit diagram of the sixth embodiment of a one-piece type video camera constructed in accordance with the present invention.

FIG. 7 is a block diagram of a circuit used in the sixth embodiment of the present invention, which comprises a voice recognizing system 630, mode control microcomputer 614 and sequence controller 612 all of which are similar to those of FIG. 5 being added to the third embodiment of FIG. 4. In addition to the operations described with respect to FIG. 4, thus, the sixth embodiment functions as illustrated in FIG. 5.

Figure 8:
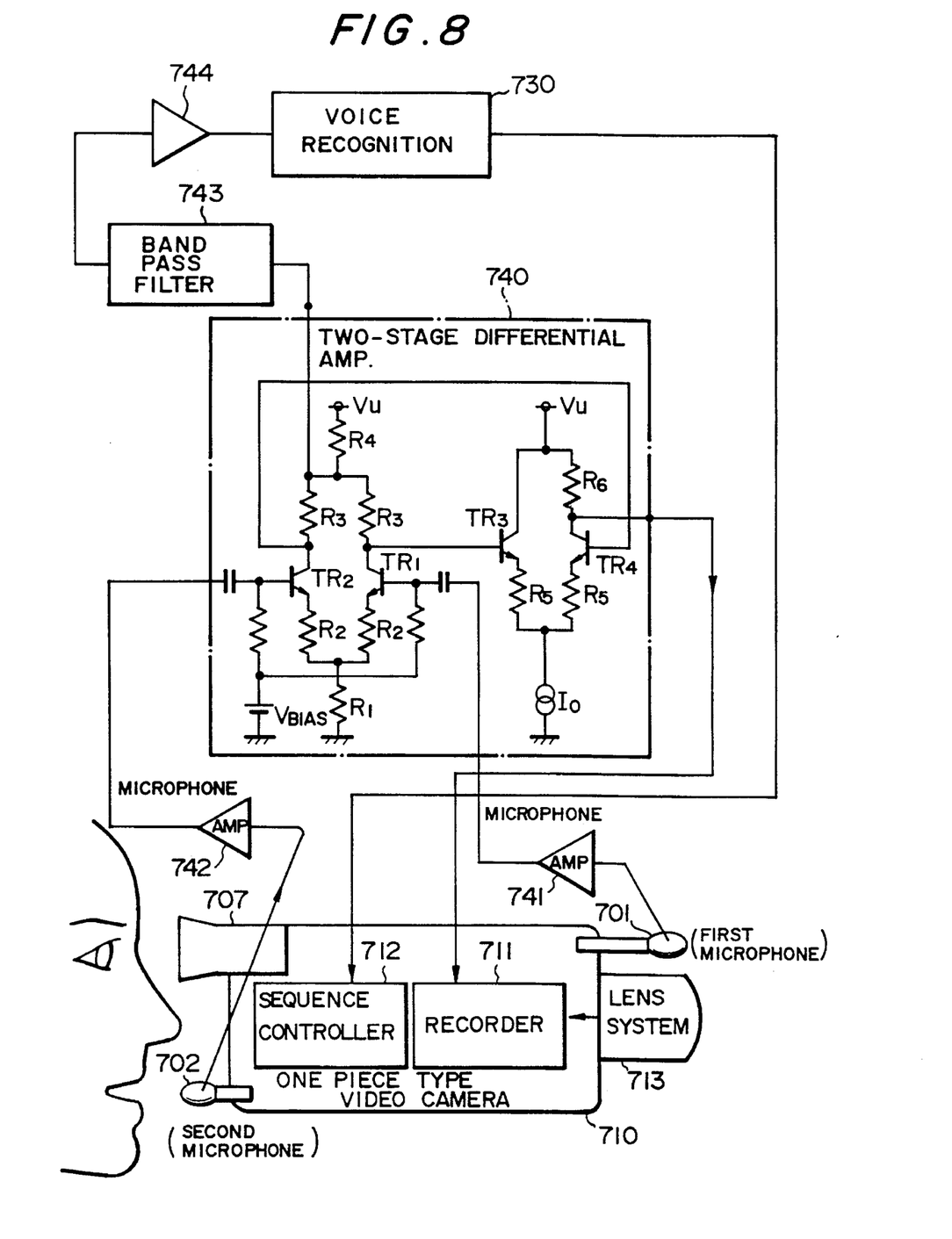
FIG. 8 is a circuit diagram of the seventh embodiment of a one-piece type video camera constructed in accordance with the present invention.
Figure 9:
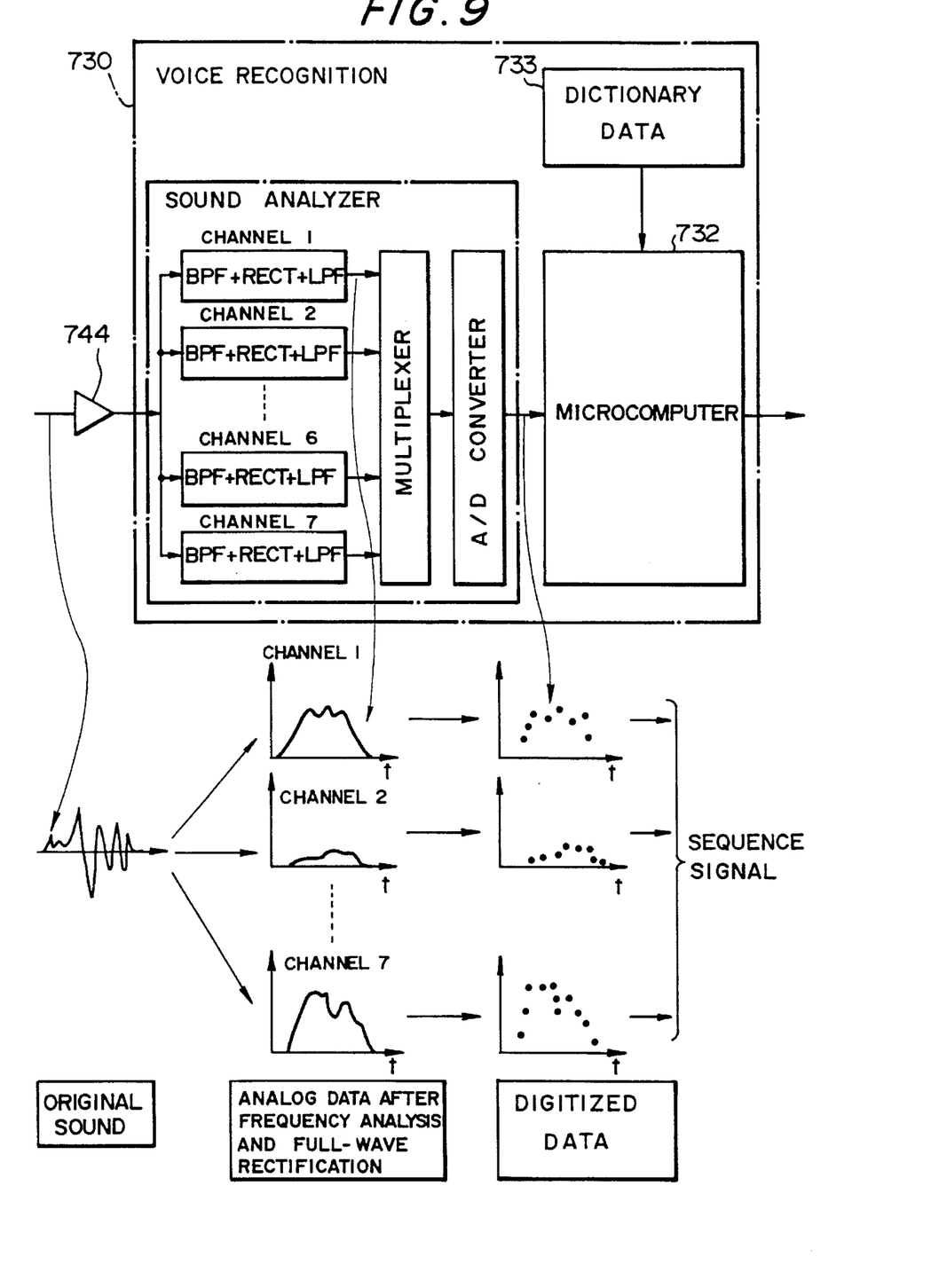
FIG. 9 is a view illustrating the arrangement and operation of the voice recognizing system used in the seventh embodiment.

FIG. 8 is a block. diagram illustrating the seventh embodiment of the present invention while FIG. 9 illustrates the circuit and functions in a voice recognizing system used in the seventh embodiment. Referring to FIGS. 8 and 9, the video camera comprises a lens system 713; a two-stage differential amplifier 740 for outputting the sum and difference components of output voice signals from first and second microphones 701, 702; microphone amplifiers 741 and 742; a band-pass filter 743 and an amplifier 744, all of which are mounted within the body of the video camera 710.

The operation of the seventh embodiment will be described below.

In the arrangement of FIG. 8, the first microphone 701 has a relatively high sensitivity and a relatively wide-beamed directivity such that a voice can be collected from a subject through a broadened range. On the other hand, the second microphone 702 has a relatively low sensitivity and a narrow-beamed directivity. Thus, the second microphone 702 will not collect the subject's voice. Voice signal collected through the first microphone 701 is amplified by the microphone amplifier 741 and then applied to the two-stage differential amplifier 740 at its transistor $TR_1$. The difference gain of the two-stage differential amplifier 740 is:

$$G_{DIF}=(R_3/R_2)(R_6/2R_5)$$

and amplified before applied to a recorder 711 in the video camera 710. The voice signal is recorded on a video tape together with an image signal from the lens system 713. At the same time, noises from various drives such as the drum motor in the recorder 711 and several motors in the lens system 713 for zooming, focusing, iris drive and others are collected together through both the first and second microphones 701, 702. Thus, these noises are canceled equivalently in the difference component. Only the voice signal from the subject can be recorded on the video tape with a good S/N ratio.

Even if any general conversation between the operator and the subject is made, for example, "move left" or "look this way", it will not be recorded on the video tape since the general conversation is collected simultaneously through the first and second microphones 701, 702.

The voice recognizing system 730 in the seventh embodiment will operate as follows:

The dictionary data storage 733 in the voice recognizing system 730 has previously store about ten commands generally used on controlling the video camera, For example, "record", "pause", "zooming-up", "zooming-down", "rear light", "stop" and others.

If the operator whispers "record" near the microphone 702 while looking in the view finder 707, that voice signal is received by the microphone 742 and then amplified by the microphone amplifier 742, the amplified voice signal being applied to the two-stage differential amplifier 740 at its transistor $TR_2$. The difference gain of the two-stage differential amplifier 740 is represented by:

$$G_{COM}=R_4/R_1+(R_2/2).$$

Thus, the voice signal is amplified by this gain at the amplifier 740 before outputted. The sum component is supplied to the voice recognizing system 730 through the band-pass filter 743 and the voice amplifier 744, wherein the content of the voice signal is identified.

The voice recognizing system 730 shown in FIG. 9 is a voice recognizing system utilizing the composite similarity accumulating process wherein an original sound inputted through the amplifier 744 is transformed into analog data through a plurality of channels (seven in FIG. 9) each of which comprises a band pass filter and a full-wave rectifier. The analog data is converted into digital data through a multiplexer and an A/D converter. At a microcomputer 732, the digitized signal data is compared with dictionary data including about ten registered commands. If there is a command corresponding to the digitized signal data in the dictionary data, an I/O signal is generated. This sequence signal is applied to the sequence controller 712 shown in FIG. 8 which in turn controls the video camera 710 in the commanded mode.

At this time, it is natural that the operator's voice commanding the operational mode of the video camera is collected slightly by the first microphone 701. However, this is negated at the two-stage differential amplifier 740. As a result, the operator's command voice signal does not appear in the difference component and will not be recorded on the video tape.

The voice recognizing system utilizing the composite similarity accumulating process is suitable for use in the voice recognition of unspecified persons. The present invention is not limited to this type but may be applied to any other suitable process such as linear matching process or the like. Furthermore, the voice recognizing system may be adapted to recognize only the voice of a specified person so as to improve the reliability.

It is desirable that the first and second microphones 701, 702 are disposed at positions in which they are directly opposed to each other. It is further desirable that the second microphone 702 is located near the mouth of the operator when he looks in the view finder 707.

Moreover, the second microphone 702 may be of a necktie pin type which is separated from the video camera body 710.

In such a manner, the recording of the operator's voice can be eliminated or reduced in level by providing a video camera which comprises a first microphone for collecting any voice incoming from a subject, a second microphone for collecting any voice emitted from an operator, an operational amplifier for subtracting the output voice signal of the second microphone from the output voice signal of the first microphone and means for recording the output voice signal of the operational amplifier on a video tape.

The elimination or reduction of the operator's voice level to be recorded on the video tape may be accomplished similarly by providing a video camera which in addition to the first and second microphones, comprises an envelope detector for detecting the envelopes of the outputs of the first and second microphones, an operational amplifier for comparing the output levels of the first and second microphones after passed through the envelope detector, a gain control circuit responsive to the output of the operational amplifier for changing the gain in the first microphone and means for recording the output signal of the first microphone on a video tape after the output signal has been regulated in gain by the gain control circuit.

In addition to the aforementioned components, the video camera of the present invention comprises a voice recognizing system for recognizing the content of a mode commanding voice signal collected through the second microphone. The voice recognizing system is responsive to the recognized content of the mode commanding voice signal to control the operational mode of the video camera. Therefore, the video camera will not require any manipulation by the operator's finger. Thus, the undesirable motion in the video camera can be avoided.

What is claimed is:

1. A video camera comprising:

a first microphone having a directivity toward a subject for collecting sounds incoming from the subject and also voice sounds from a camera operator, said first microphone converting the combined sounds into a first output voice signal;

a second directional microphone, spaced apart from said first microphone and located adjacent to the mouth of the camera operator, said second microphone having a narrow-beamed directivity toward an operator for collecting the voice sounds from the operator and to convert the operator voice sounds into a second output voice signal;

a delay element for delaying the second voice signal such that a difference between a time required to transmit the operator voice sounds between the operator and the first microphone and a time required to propagate the operator voice sounds between the operator and the second microphone will be compensated;

subtractor means for subtracting the delayed second output voice signal from the first output voice signal to form a differential output signal;

an optical system for collecting light representing the image of the subject; and recording means for recording the differential signal and the image;

whereby the level of the operator's voice sounds recorded are reduced in order to improve the clarity of the sounds from the subject.

2. The one-piece type video camera as defined in claim 9, wherein said subtractor means is an operational amplifier for receiving the first voice signal at a non-invert input terminal thereof and the second voice signal at an invert input terminal of said operational amplifier, said operational amplifier being adapted to form the differential output signal by amplifying a difference between the first and second voice signals.

3. The one-piece type video camera as defined in claim 9, further comprising:

switch means for selecting one of the differential signal and first voice signal to be supplied to said recording means.

4. The one-piece type video camera as defined in claim 9, further comprising:

a frequency filter for causing a frequency characteristic and level of the second voice signal to match a frequency characteristic and level of the first voice signal.

5. The video camera of claim 1, wherein said second microphone is adapted to collect sounds generated by mechanical vibrations created within an interior of the video camera.

* * * * *